April 14, 1931.  G. E. FOX  1,800,251
VALVE
Filed July 13, 1927
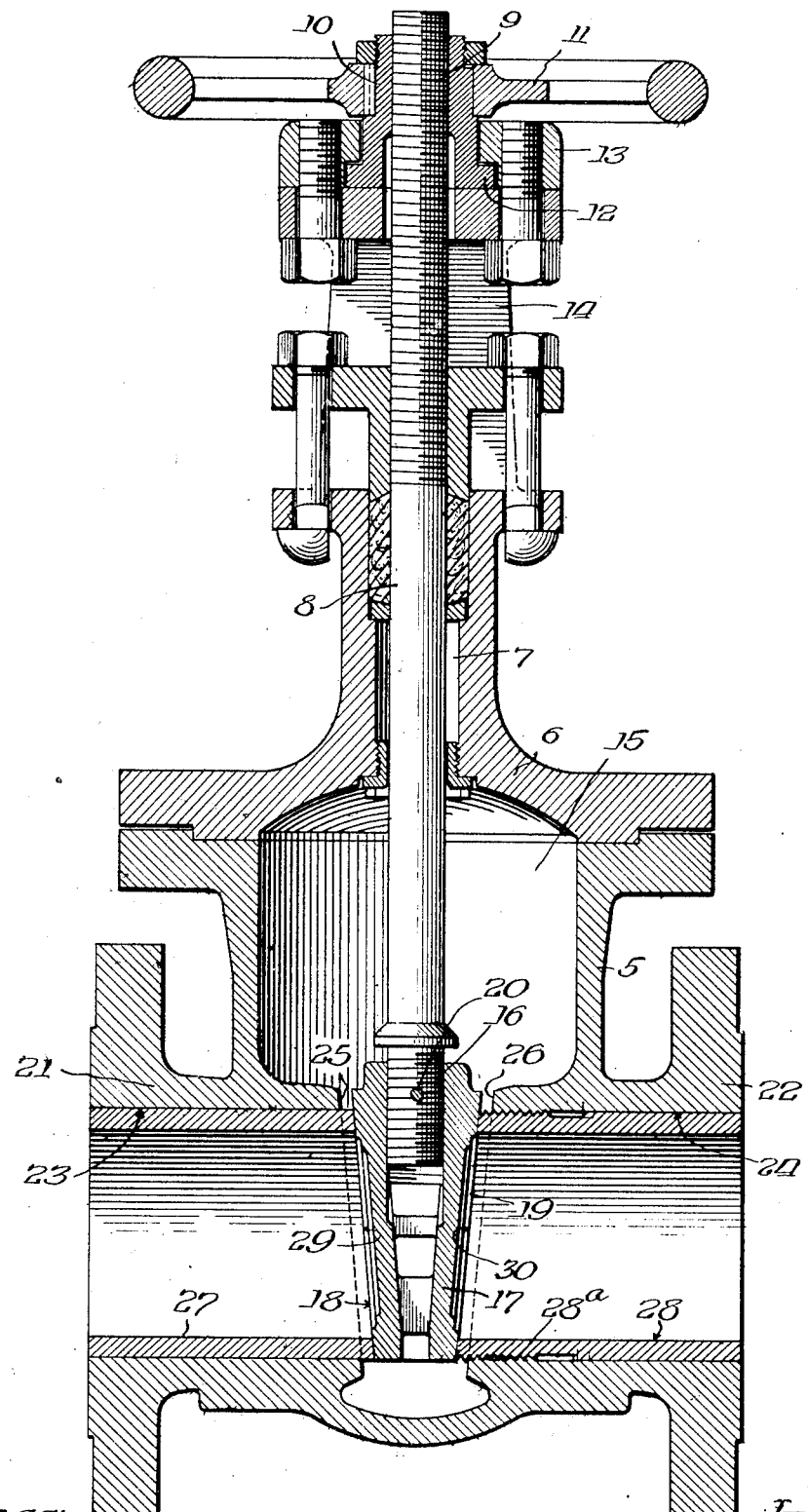
Witness:
Inventor
George E. Fox
By attorney Patented Apr. 14, 1931

1,800,251

UNITED STATES PATENT OFFICE

GEORGE E. FOX, OF BAYONNE, NEW JERSEY, ASSIGNOR TO THE CHAPMAN VALVE MANUFACTURING COMPANY, OF INDIAN ORCHARD, MASSACHUSETTS, A CORPORATION OF MASSACHUSETTS

VALVE

Application filed July 13, 1927. Serial No. 205,326.

This invention relates in general to valves for controlling the flow of fluids such as liquids, gases, and other materials under pressure. It will be understood that the invention is applicable to valves other than the specific example shown in the drawing, i. e., valves of the globe and cock construction, and that the invention, therefore, finds a wide field of utility.

It has been found in valves used for conducting fluid to a caustic or acid character that, while the valve itself may not be materially affected over a long period of time by the fluid coming in contact therewith, on the contrary, the inlet and outlet passageways and valve seats are materially affected in a short time, causing corrosion and consequent leakage. It is, therefore, one of the principal objects of this invention to provide a valve structure including an improved form of valve seat constructed of material not readily susceptible to chemical action by fluid conducted through the valve; to provide valve seats of a character which may be readily replaced in the event of wear or premature disintegration so as to avoid the necessity for repeated and frequent regrinding and/or replacing valve seats and to avoid destructive chemical action on the valve case at the inlet and outlet passageways.

A further object of this invention is the provision of an improved valve seat and liner for inlet and outlet passageways which is not readily susceptible to chemical action of fluid conducted through valves; and to provide an improved valve seat and liner of the character described which may be readily inserted into and removed from operative position in the passageway as circumstances demand.

The foregoing and such other objects and advantages as may appear or be pointed out as this description proceeds are attained in one structural embodiment of the invention as illustrated in the accompanying drawing.

Referring in detail to the drawing, a conventional form of manually operable sliding gate valve is illustrated, a valve housing or casing 5, provided with the usual bonnet 6, formed with passageway 7, for the valve stem 8. Suitable packing is provided surrounding the valve stem, and the latter is threaded as at 9, for vertical reciprocation by rotation of the nut 10, carrying hand wheel 11. The nut 10 is provided with a flange 12, retained by cap member 13, supported by the standard 14. Thus, reciprocation of the nut is prevented, but rotation of said nut is free whereby to reciprocate the stem.

The inner end of the valve stem, that is, the portion thereof located within the valve chamber 15, is threaded as at 16, and is in threaded engagement with the tapered valve member 17, which latter has its opposite faces 18 and 19 inclined and ground to form a wedging engagement with the valve seats hereinafter described.

The valve member is fixedly retained on the threaded portion 16 of the stem 8 by the provision of a locking pin 20, which latter extends through the valve and the threaded portion 16 of the valve stem.

The casing 5 is provided with oppositely disposed lateral extensions 21 and 22, these extensions being bored, as indicated at 23 and 24, to form inlet and outlet passageways.

The casing 5, is, of course, a casting, and the passageways 23 and 24 are turned to the proper diameter in a suitable manner, the inner ends terminating at the vertically inclined surfaces 25 and 26 which are substantially parallel with the complemental opposite faces 18 and 19 of the valve member.

The valve seat liners are so disposed to afford a spacing of the faces 18 and 25, and 19 and 26 whereby the valve seats extend beyond the faces 25 and 26 into position to receive the valve when seated.

In the conventional structure heretofore employed in valves of this type, it has been customary to employ valve seats which are introduced into the valve housing through the bonnet 6. In the present arrangement, I provide liners 27 and 28 inserted into the bores 23 and 24 from opposite ends thereof, these liners being formed of non-corrodible metal of high wearing quality, the said liners being of outside diameter, such as will cause them to fit tightly within the bores 23 and 24.

In one arrangement of this invention, I find it convenient to secure the liners in position by a suitable expanding process, and at the left of the figure of the drawing this is illustrated, a liner 27 secured in position by such an expanding method.

In some instances it is desirable to thread the liners in position, and this arrangement is illustrated at the right of the figure in the drawing, where it will be seen that the liner 28 is threaded into the passageway at 28a.

In either event, the inner peripheral surfaces of the liners 27 and 29 are ground in planes parallel with the surfaces 18 and 19 of the valve member, as shown at 29 and 30, so that when the valve is seated the surfaces 18 and 19 will evenly and firmly engage the surfaces 29 and 30 and thereby effectively prevent the flow of liquid through the valve passageways.

It will be observed that in this construction the valve seat and liners are formed in one piece and that regrinding of the valve seat when necessary may be readily accomplished without removing the liners from the valve housing or, after grinding these seats beyond a predetermined amount, they may be conveniently advanced in the passageways toward the valve seat, first, re-shrinking, then advancing and securing. In the event that the liners are threaded into the passageways it will, of course, after such advancement, in some instances then be necessary to regrind the valve seat to allow for necessary rotation of the liner.

Having thus described my invention and illustrated its use, what I claim as new and desire to secure by Letters Patent is:

1. In a valve structure, a housing having a passageway therethrough communicating with a valve chamber having a substantially wedge shaped valve pocket disposed transversely of said passageway and dividing said passageway into two alined portions having inclined inner opposed end wall portions, a tapered valve member movable into position between the surfaces of said end wall portions but spaced therefrom, a liner relatively movable in one of the portions of said passageway extending substantially the entire length thereof, said liner being reinforced by and projecting beyond one of said end wall portions and having a peripheral end surface substantially parallel with the complemental end wall surface for forming a seating surface for said valve member.

2. In a valve structure, a housing having a passageway therethrough communicating with a valve chamber having a substantially wedge shaped valve pocket disposed transversely of said passageway and dividing said passageway into two alined portions having inclined inner opposed end wall portions, a tapered valve member movable into position between the surfaces of said end wall portions but spaced therefrom, and a liner relatively movable in one of the portions of said passageway extending substantially the entire length thereof, said liner being reinforced by and projecting beyond one of said end wall portions and having a peripheral end surface substantially parallel with the complemental end wall surface for forming a seating surface for said valve member, said liner being normally fixed but adapted to be moved toward said valve for compensating for wear of said seating surface.

3. In a valve structure, a housing having a passageway therethrough communicating with a valve chamber having a substantially wedge shaped valve pocket disposed transversely of said passageway and dividing said passageway into two alined portions having inclined inner opposed end wall portions, a tapered valve member movable into position between the surfaces of said end wall portions but spaced therefrom, and a liner formed of a material different from that of said housing normally fixed but capable of convenient movement to compensate for wear and disposed in one of the portions of said passageway and extending substantially the entire length thereof, said liner being reinforced by and projecting beyond one of said end wall portions and having a peripheral end surface substantially parallel with the complemental end wall surface for forming a seating surface for said valve member.

In testimony whereof I have hereunto signed my name.

GEORGE E. FOX.